United States Patent
Louks et al.

(10) Patent No.: US 6,726,743 B2
(45) Date of Patent: Apr. 27, 2004

(54) ELECTROSTATIC DEAERATION METHOD AND APPARATUS

(75) Inventors: John W. Louks, North St. Paul, WI (US); Steven H. Gotz, North St. Paul, MN (US); Luther E. Erickson, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/175,335

(22) Filed: Jun. 18, 2002

(65) Prior Publication Data

US 2003/0230193 A1 Dec. 18, 2003

(51) Int. Cl.$^7$ ................................................ B03C 3/016
(52) U.S. Cl. ................ 95/30; 95/57; 95/70; 95/243; 95/262; 96/55; 96/96; 96/97; 96/175; 96/204; 96/220
(58) Field of Search ................ 95/30, 57, 70, 95/63, 243, 262; 96/55, 175, 204, 97, 96, 220; 210/748, 243; 204/564, 563

(56) References Cited

U.S. PATENT DOCUMENTS

| | | | | |
|---|---|---|---|---|
| 1,963,325 A | * | 6/1934 | Eddy et al. | 204/563 |
| 2,209,798 A | * | 7/1940 | Subkow | 208/350 |
| 2,240,495 A | * | 5/1941 | Dillon et al. | 96/88 |
| 3,074,870 A | * | 1/1963 | Carswell et al. | 204/563 |
| 3,183,077 A | | 5/1965 | Kraus | 75/10.64 |
| 3,255,571 A | * | 6/1966 | Walker et al. | 204/563 |
| 3,429,743 A | * | 2/1969 | Branson | 134/1 |
| 3,584,438 A | | 6/1971 | Skoli et al. | 96/199 |
| 3,768,726 A | | 10/1973 | Hale et al. | 494/10 |
| 3,928,003 A | | 12/1975 | Fryar | 95/261 |
| 3,932,150 A | | 1/1976 | Komai et al. | 96/150 |
| 4,226,689 A | * | 10/1980 | Mayse et al. | 204/563 |
| 4,226,690 A | * | 10/1980 | Martin | 204/560 |
| 4,874,507 A | | 10/1989 | Whitlock | 209/11 |
| 4,919,777 A | | 4/1990 | Bull | 210/774 X |
| 4,997,464 A | | 3/1991 | Kopf | 96/6 |
| 5,106,468 A | * | 4/1992 | Chimenti | 204/564 |
| 5,262,027 A | * | 11/1993 | Scott | 204/558 |
| 5,522,917 A | | 6/1996 | Honda et al. | 95/46 |
| 5,575,896 A | * | 11/1996 | Sams et al. | 204/564 |
| 5,830,261 A | | 11/1998 | Hamasaki et al. | 96/6 |
| 5,861,089 A | * | 1/1999 | Gatti et al. | 204/563 |
| 5,879,317 A | | 3/1999 | Plunkett | 604/4 |
| 5,882,325 A | | 3/1999 | Plunkett | 604/4 |
| 5,888,275 A | | 3/1999 | Hamasaki et al. | 96/6 |
| 5,993,518 A | | 11/1999 | Tateyama | 95/261 |
| 6,338,749 B1 | | 1/2002 | Fulk et al. | 95/266 |
| 6,428,669 B2 | * | 8/2002 | Klippel et al. | 204/555 |

FOREIGN PATENT DOCUMENTS

| | | |
|---|---|---|
| EP | 0 374 942 B1 | 5/1994 |
| GB | 365290 | 1/1932 |
| GB | 2 067 086 A | 7/1981 |
| JP | 11090110 | 4/1999 |
| SU | 1 500 341 | 8/1987 |
| WO | WO 01/76769 A2 | 10/2001 |

* cited by examiner

Primary Examiner—Richard L. Chiesa
(74) Attorney, Agent, or Firm—Rick L. Franzen (57) ABSTRACT

This disclosure relates to a method for deaerating a liquid layer such as a coating solution using electrostatic forces. A flow of charged particles is created above and moved towards a low conductivity liquid layer. The flow of charged particles causes localized thinning of the liquid layer which facilitates the removal of bubbles of entrained gas from the liquid by bringing those bubbles closer to the exposed surface of the liquid and rupturing them at that surface. This electrostatic deaeration technique is combined with other non-electrostatic liquid layer thinning techniques or degassing techniques to further facilitate removal of bubbles from the liquid in preparation of further processing of the liquid. The liquid layer may be stationary or flowing with respect to the application of charge particles.

39 Claims, 7 Drawing Sheets

ELECTROSTATIC DEAERATION METHOD AND APPARATUS

BACKGROUND OF THE INVENTION

This invention relates to a method and apparatus for deaerating a low conductivity liquid. In a liquid coating process, the present invention employs electrostatic forces to deaerate the coating liquid prior to or after the coating step.

Deaerating, debubbling, defoaming, and degassing are commonly used to describe the same processes of removing a gas from a liquid. In this application, we define defoaming as removing surface bubbles, degassing as removing adsorbed gasses in fluids, creating bubbles, and growing existing bubbles to a larger size, and debubbling or deaerating as removing bubbles from a liquid, including from the surface. Vacuum and ultrasonic devices work by removing adsorbed gasses by forming tiny bubbles and growing existing bubbles to larger diameters. The bubbles are then brought to the surface using gravitational or centrifugal forces, with larger bubbles being removed more rapidly. In this application, we further define "deaerating" to mean facilitating the removal of bubbles of entrained gas from the liquid, by bringing those bubbles closer to the exposed surface of the liquid and rupturing them at that surface.

This invention has particular utility with respect to the deaeration of coating liquids, and especially for lower conductivity coating liquids, and even more especially for such coating liquids which have higher viscosities. Air entrapment and bubble formation is common in coating methods where the coating liquid is agitated or recirculated. Roll or gravure applicators which use open pans to supply liquid to the coating rolls are often hampered by air entrainment. Some coating liquids also have a tendency to contain or form a significant number of bubbles, especially those with high loadings of surfactants. In addition, the higher the viscosity of the coating liquid, the more difficult it is to remove any bubbles entrained therein. If a bubble gets caught at an interface during the coating process, such as between two coating rolls or in the gap between a die and a coating substrate, streaks and other defects in the coating can occur. In addition, if bubbles are present in the coating liquid dispensed from a curtain or slot coater, not only are defects in the coated products likely (such as bubbles or thin spots), but they may also cause the curtain or extrusion column to break. If air is trapped in the coating liquid as it enters into an oven, blisters and bubble defects will be seen in the dried product.

Known deaerating methods for coating liquids attempted to remove gas (e.g., air) from the coating solution prior to the coating step by holding the solution in a tank, by vacuum extraction, or by ultrasonic agitation. The use of large settling tanks inhibits quick changeover of the solution and increased waste thereof. Additionally, the higher the coating solution's viscosity, the longer it's necessary residence time (i.e., the longer it takes for the bubbles to rise to the surface). Vacuum methods of degassing and deaeration must maintain an effective seal against large vacuum levels, which is both costly and difficult to achieve. Ultrasonic methods are cost effective at degassing solutions by removing adsorbed air from the solution and growing larger bubbles in the solution that then more readily move to the solution's surface due to gravitational forces, but are not as effective at breaking the bubbles at the surface of the coating solution.

BRIEF SUMMARY OF THE INVENTION

In one embodiment, the present invention is a method of deaerating a gas contained in a low conductivity liquid. The method includes providing a support surface and establishing a layer of liquid having a first lower surface contacting a support surface and a second exposed surface. The layer of liquid has bubbles of gas entrained therein and has a thickness. The method further includes causing localized thinning of the layer of liquid by providing a flow of charged particles above the layer of liquid and towards the support surface, whereby the bubbles of gas entrained in the layer of liquid are moved closer to the second exposed surface and ruptured.

BRIEF DESCRIPTION OF THE DRAWINGS

The present invention will be further explained with reference to the drawing figures listed below, wherein like structures are referred to by like numerals throughout the several views.

While the above-identified drawing figures set forth several embodiments of the invention, other embodiments are also contemplated, as noted in the discussion. In all cases, this disclosure presents the present invention by way of representation and not limitation. It should be understood that numerous other modifications and embodiments can be devised by those skilled in the art which falls in the spirit and scope of the principles of this invention.

DETAILED DESCRIPTION

The present invention facilitates deaeration of a liquid using electrostatics to drive bubbles entrained in the liquid to an exposed surface of the liquid, and to break up those bubbles once at or near that exposed surface. The application of electrostatic charges to a layer of liquid having a thickness results in a "thinning" of the liquid layer. As a consequence, bubbles within the liquid move closer to the liquid surface to facilitate their bursting, and bubbles on the liquid's surface are stressed and burst, thereby deaerating the liquid. The invention is directed to the application of electrostatics to a layer of liquid for this purpose, and includes combining electrostatic effects with additive liquid layer thinning techniques. The invention also includes combining electrostatic liquid layer thinning with other degassing or deaerating techniques, such as with the application of acoustically exciting the liquid, or slinger-degassers.

"Thinning" the liquid layer via exposing the liquid layer to a flow of charged particles does not occur in a significant manner if the liquid layer is sufficiently conductive. Thus, the invention has particular utility with respect to low conductivity liquids. Such liquids have a fluid conductivity sufficiently low such that electrostatic charges applied to an exposed surface of the liquid reside near the surface sufficiently long to create local deformation and thinning of the original surface of the liquid, in order to move bubbles closer to the exposed surface and for those bubbles to be ruptured. Stated another way, the electrical resistivity of the liquid is sufficiently high such that charges applied to the exposed surface of the liquid create a stress on the liquid for a sufficient duration of time to create local deformation and thinning of the liquid thickness, in order to move bubbles closer to the exposed surface and to rupture those bubbles.

As long as a low conductivity liquid has the requisite electrical resistivity, it is a candidate for deaearation using the present invention. Examples of low conductivity liquids having the requisite electrical resistivity for this purpose include liquids such as 100% solids curable fluids and hot melt fluids. If a liquid is too highly conductive, then the application of electrostatics as disclosed herein will not cause sufficient thinning of the liquid, and the deaeration effects desired cannot be obtained.

Of course, deaeration is not necessary if there are no bubbles entrained in a liquid layer. However, in many instances, bubbles are found in liquids, and it is highly desirable to remove those bubbles, especially in coating applications. The failure to remove the bubbles will result in defects in the coating process and in the uniformity of the ultimate coating achieved. Bubbles entrained in a liquid layer may be of many sizes, and includes those bubbles on the exposed surface of the liquid layer. For example, in FIG. 1, a liquid layer 10 is defined by a liquid 12 having bubbles 14 therein. Some of the bubbles entrained in the liquid are embedded within the liquid layer 10, while others reside on or adjacent an exposed upper surface 16 thereof. The liquid layer 10 also has a lower surface 18, which is in contact with a support surface 20 on a supporting member 22.

Figure 1:
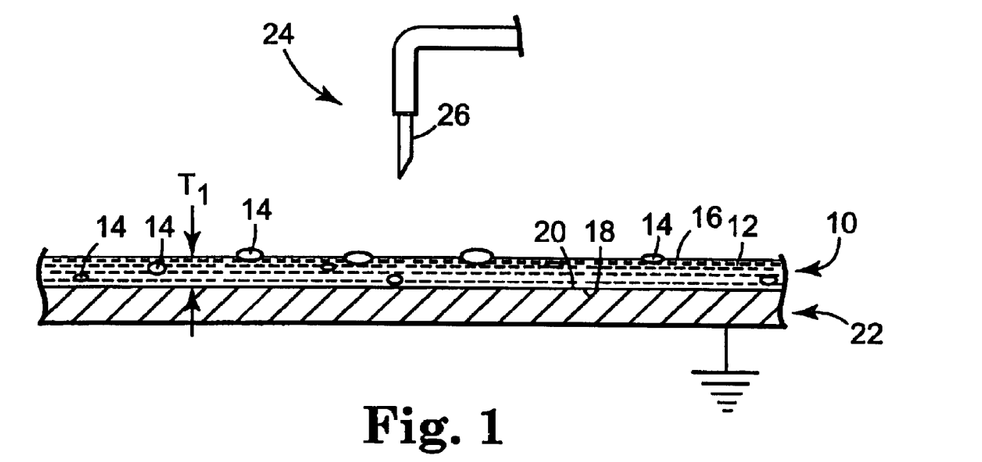
FIG. 1 illustrates a liquid layer having bubbles entrained therein, prior to the application of electrostatic deaeration.

In order to deaerate the liquid layer 10, it is necessary to remove the bubbles 14 therefrom. One means for doing this is to bring the bubbles 14 to the exposed surface 16 so that the bubble's skin (of liquid 12) is exposed to be stressed, and thus burst. The ability to readily achieve this using electrostatics depends on several factors of the liquid 12 itself, including its viscosity, thickness and conductivity, surface tension and other properties of the liquid, and also on such factors as the liquid's flow rate (for a moving stream liquid layer) and the electrostatic field level.

The inventive process is not a degassing process, which typically involves facilitating the joinder of small bubbles in a liquid into larger bubbles for ease of removal, nor is it a mere defoaming process, which involves breaking bubbles on the surface of a liquid. The present invention is directed to deaeration of a liquid by placing electrostatic stresses on the exposed surface of the liquid, with the liquid having at least some resistivity, which thereby results in a localized thinning of the liquid so that bubbles are moved nearer the exposed surface and are ruptured.

As noted above, the present invention has application in removing air from a coating solution prior to the coating of that solution on a substrate. Once subjected to the inventive process for deaeration, the coating solution would then be supplied to a coater device. Alternatively, a coated article may be subjected to the inventive electrostatics process after the coating has been applied. Many potential applications exist for the application of the inventive deaeration process, since air in coating solutions presents problems for virtually all coating methods. Curtain coaters are particularly sensitive to air in the coating solution since such contamination can result in curtain breaks. The inventive deaeration process can be used to eliminate air from the solution feeds to die coaters such as curtain coaters, slide or slot. Pan application coaters such as gravure, reverse roll, wrap cast and curtain over roll can be improved by recirculating the coating solution through the inventive deaerator process and then resupplying the deaerated coating solution to the pan. Generally, coating defects can be decreased, thinner coatings can be achieved, and coating speeds can be increased if air is effectively removed from the coating solution. This electrostatic deaeration invention is a very effective means for deaerating lower conductivity coating fluids, especially for such fluids with higher viscosities (such as 100 centipoise or greater, 1000 centipoise or greater, or even higher), since removing air from a fluid becomes increasing difficult with as the fluid's viscosity increases. Even low viscosity fluids, such as 5 or 10 centipoise, can suffer deaeration problems when the required flow rates are high and standard gravitational bubble rise time methods are too slow.

Figure 2:
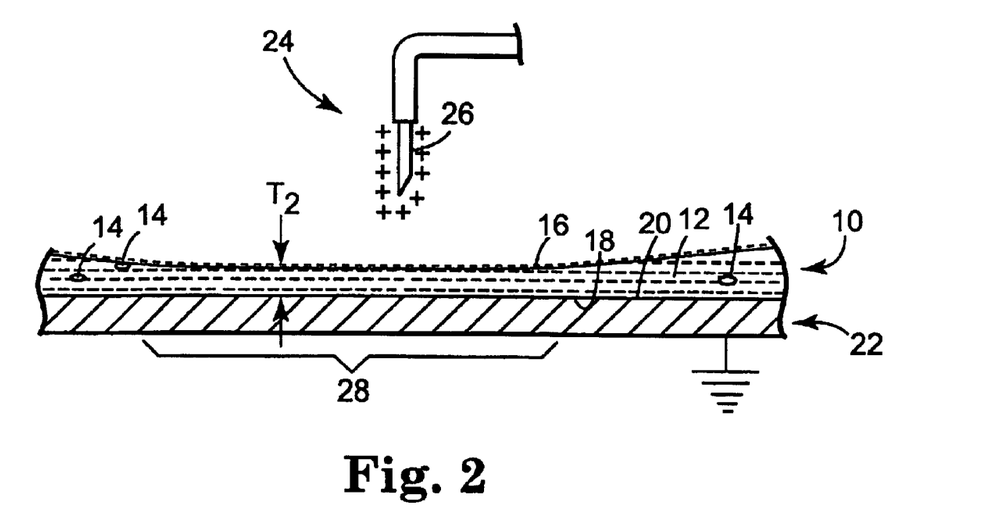
FIG. 2 illustrates the liquid layer of FIG. 1, after the application of electrostatics thereto.

FIGS. 1 and 2 illustrate the electrostatic deaeration invention on a non-moving liquid layer 10. The liquid layer 10 resides on a supporting member 22. An electrostatic charge station 24 is disposed above the liquid layer 10. Charge station 22 is defined by an electrode 26 which is charged by a suitable power source (not shown). Supporting member 22 is grounded, and electrode 26 is charged with a positive potential (it is not necessary that the supporting member 22 be grounded, but only that it have a different (i.e., attractive) potential from the charged particles generated by the electrode 26). Accordingly, when the electrode 26 is electrically energized, a flow of charged particles is defined by the charged electrode 26, which are attracted to the grounded supporting member 22. The flow of charged particles is initially above the liquid layer 10 and moves via attraction towards the support surface 20. The charged particles traveling towards the support surface are interrupted by the liquid layer and reside on or adjacent the liquid surface momentarily. The electrical field between the charged particles and the support surface creates an electrical force which tends to thin the liquid since the charged particles on the liquid surface are attracted toward the support surface. For lower conductivity fluids, the electrical relaxation times are longer, and the force exists for a longer period of time, allowing further thinning to occur. As seen in FIG. 1, liquid layer 10 has a thickness $T_1$ prior to the application of electrostatics, while FIG. 2 illustrates that the liquid layer 10 has a thickness $T_2$ in that portion affected by electrostatics (locally adjacent the electrode 26), where $T_1 > T_2$. As noted above, liquid layer 10 is a low conductivity liquid which is stationary (non-moving relative to the supporting member 22 and charge station 24). As illustrated in FIG. 2, the bubbles 14 in the area of localized thinning are moved closer by the thinning of the liquid layer 10 to the exposed surface 16 of the liquid layer 10 and ruptured, so that an area of localized thinning 28 is now generally free of bubbles 14 entrained therein. In addition to electrostatic deaeration as discussed herein, the liquid 12 may also be subjected to a degassing process prior to or at the same time as the application of electrostatics at the charge station 24.

In one embodiment of the apparatus illustrated in FIGS. 1 and 2, the electrode 26 comprises a corona needle held at 20 KV, which was placed about 0.5 inch (prior to the application of electrostatics) from the exposed surface 16 of the liquid layer 10 (as seen in FIG. 1), which in this case was a 100% solids curable acrylate syrup. Prior to the onset of the charged particles, the liquid layer thickness was approximately 0.05 inches, while shortly thereafter (within one second), the thickness was about 0.01, then further reduced with time to a thinner terminal thickness (the magnitude of these numbers depend largely on the fluid conductivity, viscosity, elasticity and other liquid properties as well).

This arrangement resulted in a treatment area of about 2 to 6 square inches (i.e., the area of localized thinning 28). Since the liquid 12 being treated had a low conductivity (approximately 9 nanoSiemens per meter (a nanoSiemen is $10^{-9}$ Siemen)), charges reside momentarily on the surfaces of the bubbles 14 and on the exposed surface 16 of the liquid 12. Thus, both the bubbles 14 and exposed surface 16 are driven towards the grounded support surface 20 by the field gradient defined by the charged particles from the electrode 26. This not only creates stress which ruptures the bubbles 14, but creates an attractive force between the exposed surface 16 of the liquid 12 and the grounded support surface 20. This force causes liquid 12 to flow away from the plane formed between the corona source (electrode 26) and the grounded support surface 20, resulting in a localized thinning of the liquid 10 as shown in FIG. 2 (area 28). This exposes the bubbles 14 that were previously near the middle of the liquid layer 10 by forcing them closer to the exposed surface 16. When the bubbles 14 are sufficiently close to the exposed surface 16 (i.e., within 0.030 inches), they become stressed and rupture.

Generally, as the voltage is increased, an increasing level of thinning is observed. With further increases the liquid surface becomes non-smooth and can take on a patterned or textured appearance. This can also include generating turbulence to the liquid surface, all of which can create increased levels of effectiveness as the liquid continues to become thinner. While not wishing to be bound to the theory, it is believed that the non-smooth liquid surface (surface patterns and surface roughening) creates micro liquid flows and micro vortices that facilitate bubble motion toward the liquid surface. As the non-smooth liquid surface is occurring, areas in the liquid that are thinner result in even a higher electrostatic field in the liquid and further thinning the liquid, causing small flow patterns in the liquid. These surface patterns can be in the range of wavelengths 0.2 cm or larger or smaller depending on the liquid properties. The wavelength also becomes shorter as the liquid becomes thinner. If the voltage becomes too high, however, the liquid may become too thin and an electrostatic discharge or arc can occur. This is generally an undesirable situation and can actually create new or additional bubbles in the liquid.

While in the embodiment discussed above, the charge station is described as an electrode, the charge station may comprise any suitable structure that delivers a corona discharge (charged particles traveling from the charge station to the liquid surface). Suitable structures for this purpose might include, depending upon the application, a needle, a knife, a sharp edged blade, a wire or a remote ion generator.

In many applications of the inventive method, relative longitudinal movement between the liquid layer 10 and charge station 24 occurs. For instance, in an application where the liquid layer is a flowing stream liquid layer, the stream of liquid would flow past a stationary charge station. Alternatively, the liquid layer may be borne by a moving supporting member which carries the liquid layer past a stationary charge station. In some applications, the supporting member and liquid layer may even be moving at different relative velocities. In another embodiment of the invention, the charge station may be moving, while the supporting member and/or liquid layer may be stationary and/or moving at different relative velocities with respect to the charge station.

Figure 3:
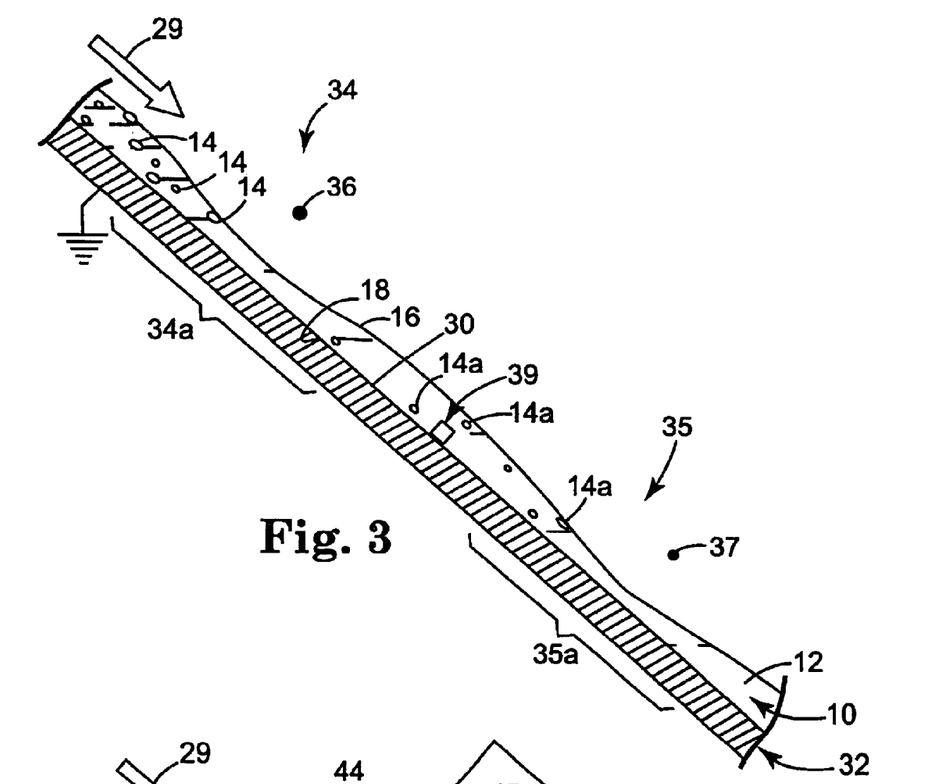
FIG. 3 illustrates a moving stream liquid layer which is sequentially exposed to longitudinally spaced, multiple electrostatic charge stations.

FIG. 3 illustrates a liquid layer 10 flowing downhill in direction of arrow 29 along an inclined support surface 30 of a supporting member 32. In this embodiment, multiple electrodes are positioned along the slide or incline defined by the support surface 30, with each electrode being spaced above the exposed surface 16 of the liquid layer 10. For the application of electrostatics purposes, the support member 32 again may be grounded, with each electrode providing a positive flow of charged particles above the liquid layer 10 and towards the grounded support surface 30. A first charge station 34 is defined by a first electrode 36, while a second charge station 35 is defined by a second electrode 37. The first and second charge stations 34 and 35 are spaced longitudinally along the support surface 30. Accordingly, the liquid layer 10 is subjected to multiple doses of electrostatic charge exposure to facilitate deaeration thereof by localized thinning (as at areas 34a and 35a). As illustrated in FIG. 3, liquid 12 passing through the first charge station 34 may still have some remaining bubbles 14a entrained therein, so that a second application of electrostatics at the second charge station 35 will further facilitate the movement of those bubbles toward the exposed surface 16 of the liquid layer 10 and the consequent rupture thereof. Of course, more than two charge stations may be provided in a particular deaeration arrangement, to treat liquids which are more difficult to deaerate. As the liquid is flowing, vortices can occur as a result of the electrostatic thinning which facilitate bubble movement to the surface. This can occur whether the flow remains laminar or becomes non-laminar or turbulent. Excessive turbulence in viscous liquids can create "fold overs" which can trap and entrain air in the liquid and should be avoided.

The extent of localized thinning caused by the flow of charged particles to the exposed surface of the liquid layer is highly dependant on the electrical conductivity of the liquid. Liquids with higher conductivities can still locally thin, but will be less effective at thinning and moving bubbles to the surface and may require higher voltages and larger or multiple charge stations. Thus for example if the liquid conductivity is about 50 microSiemens per meter (a microSiemen is $10^{-6}$ Siemen), then it may not be as effective as it it were say 10 nanoSiemens per meter and would require lower flow rates or an increased number of multiple charge stations. Additionally, higher viscosity liquids may also require larger (wider) or multiple charge stations. Lower viscosity liquids at the same flow rates flow will have a reduced thickness when flowing down an inclined surface as in FIG. 3, or will flow at a higher velocity for the same thickness, thus giving a higher throughput of liquid. Also, higher viscosity liquids require the liquid to have lower conductivity to be effective. For example, an epoxy acrylate hot melt curable syrup with a viscosity of approximately 10,000 to 20,000 centipoise at about 250 degrees Farenheit and a conductivity of 16 nanoSiemens per meter will be functional and can generate a non-smooth surface which facilitates bubble motion to the exposed surface, whereas the same liquid viscosity but with a conductivity of 11 microSiemens per meter is not as effective at locally thinning and did not provide a non-smooth surface and consequently was less effective.

In the embodiment illustrated in FIG. 3, the electrodes 36 and 37 are corona wires which, when electrically energized, generate charged particles for their respective charge stations 34 and 35. In addition, a static mixer 39 is disposed within the stream of moving liquid 12, longitudinally between the charge stations 34 and 35. The static mixer 39 may take the form of a structure such as a wall, weir or dam disposed within the liquid layer 10, or may comprise a microreplicated surface defined on the support surface 30 or on an additional structure disposed therein. The static mixer 39 serves to disturb the laminar flow of the liquid 12 of the liquid layer 10 as it flows past the static mixer 39, thereby facilitating movement of bubbles 14 adjacent the lower surface 18 of the liquid layer 10 towards the exposed upper surface 16 thereof. A microreplicated surface may be particularly useful for this purpose when a thinner liquid layer is used.

In the context of this disclosure, a "microreplicated surface" is a surface made by a process where the surface has structured features (e.g., pyramids, channels, stems, etc.) which retain an individual feature fidelity during manufacture, from product-to-product, that varies no more than about 50 micrometers. The use of polymeric materials for forming the microreplicated surface allows individual feature fidelities to be maintained in the manufacturing process at relatively high tolerances. Since this process produces relatively small structures and is sometimes repeated many times over the process is referred to as microreplication. Suitable processes for microreplication are described in U.S. Pat. No. 5,514,120.

Figure 4:
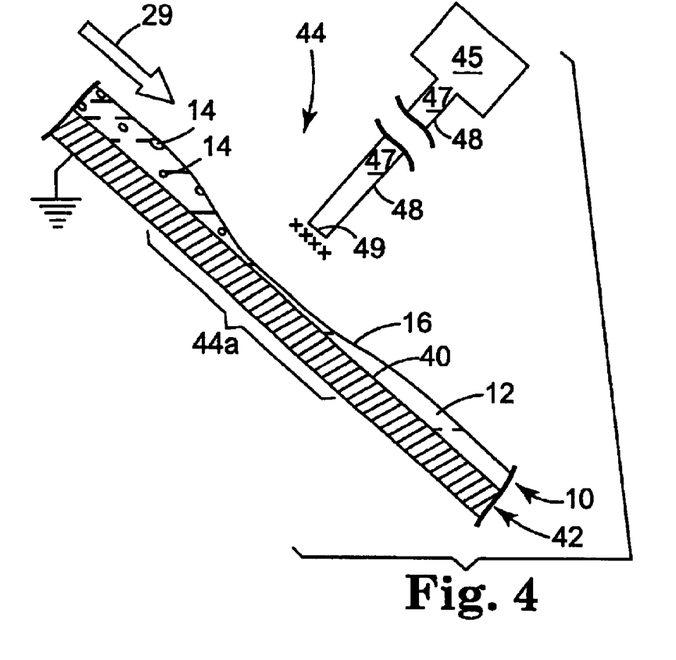
FIG. 4 illustrates an alternative charge station configuration which, in this case, is disposed above a moving stream liquid layer.

FIG. 4 also illustrates an embodiment with the liquid layer 10 moving downwardly, along an inclined support surface 40 of a supporting member 42, in direction of arrow 29. In this embodiment, the flow of charged particles at a charge station 44 is not provided by an electrode, but rather by a remote ion generator 45. Charge particles are generated by the ion generator 45 and transferred to the charge station 44 through a fluid medium (such as air 47 in a conduit 48) until directed from a charge outlet 49 in a flow above and towards the liquid layer 10 (relative to the grounded supporting member 42 and its support surface 40). As described previously, the flow of charged particles causes local thinning (e.g., area 44a) of the moving stream of the liquid layer 10 as it moves past the charge station 44, thereby moving the bubbles 14 of gas entrained in the liquid layer 10 closer to the second exposed surface 16 of the liquid layer 10 and rupturing those bubbles.

Figure 5:
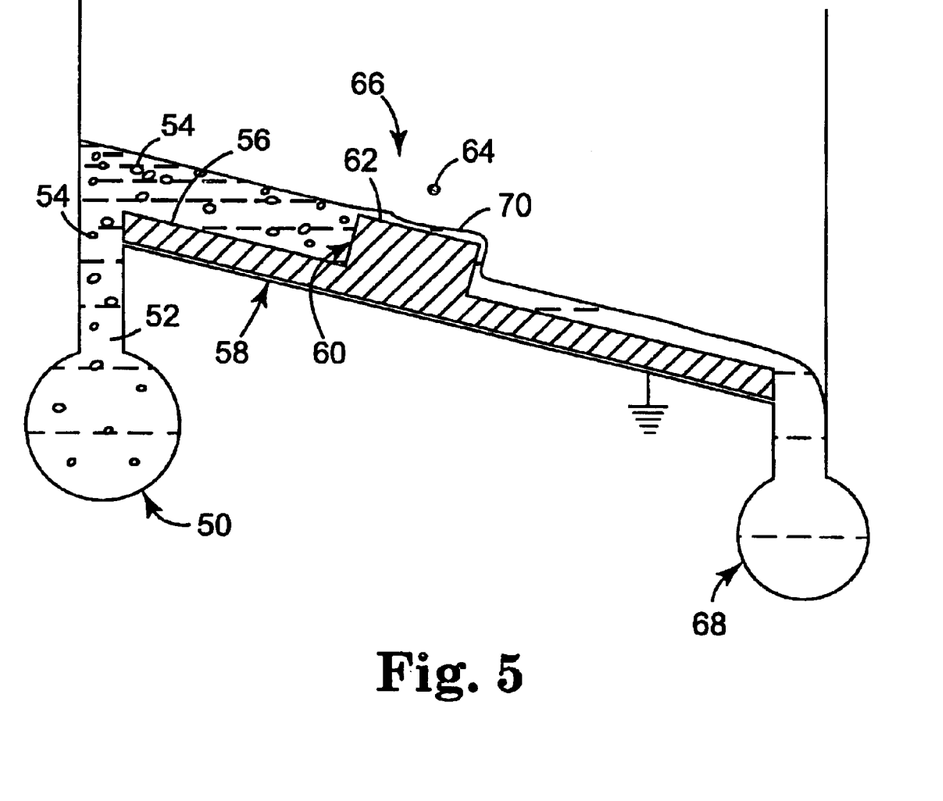
FIG. 5 illustrates a moving stream liquid layer and an associated electrostatics application apparatus which includes a charge station and a liquid thinning structure disposed in the path of the liquid layer.

FIG. 5 illustrates another embodiment of an inclined deaeration structure for use in implementing the present invention. In this embodiment, a coating solution feed 50 acts as a source of coating solution 52, with gas bubbles 54 entrained therein. The coating solution 52 is fed to a slide defined by a support surface 56 on a supporting member 58. The supporting member 58 is also comprised as an ultrasonic plate deaeration device, being accoustically activated by an acoustic generator (not shown). The ultrasonic energy applied by the supporting member 58 to the coating solution 52 does not substantially contribute to breakage of the bubbles 54, but does cause adsorbed air in the coating solution 52 to form into bubbles 54 and enlarges the size of existing bubbles. A coating solution thinning structure 60 is disposed on the support surface 56. The structure 60 itself has a coating solution support surface 62 disposed below an electrode 64 (i.e., corona wire). After flowing past the electrode 64 (which defines a charge station 66), the coating solution 52 is collected for further processing within a coating solution reservoir 68.

In one form of this embodiment, the electrode 64 is an 0.008 inches diameter corona wire, held at 20 KV. In one example of this arrangement, bubbles 54 in the coating solution 52 ranged from 0.005 to 0.25 inches in diameter. The coating solution 52 constituted 100% solids radiation curable acrylate syrup. A coating solution flow rate of 2 liters/min. was run, which appeared to be a much lower flow rate than the apparatus could ultimately handle. The working electrostatic exposure area was only about 10 square inches of fluid surface. As the coating solution 52 passed the charge station 66, thinning of the coating solution 52 occurred, and as a consequence, bubbles 54 moved toward an exposed surface 70 of the coating solution 52 and the bubbles broke, so that the coating solution 52 (downstream from the charge station 66) was essentially bubble free (i.e., deaerated). While many geometries of an electrostatic deaeration system are functional, the main features of the embodiment shown in FIG. 5 are a slide area (support surface 62) where a fairly thin film of coating solution 52 is formed (about 0.050 inches or less), with the slide area having a coating solution thinning structure 60 for bringing bubbles in the fluid to its exposed surface, and a multiple number of corona wires (or one or more remote ion generators) to supply the necessary surface charges with the charges directed to the slide area by an air stream. The addition of ultrasonics to the use of electrostatics provides an effective means for degassing and deaerating a liquid, either simultaneously or in series.

As illustrated in the embodiment of FIG. 5, a thinning structure 60 is provided which, like the structure 39 illustrated in FIG. 3, is disposed within the moving stream liquid layer. Such a structure can take the form of a dam, weir or other flow obstruction, including a textured surface of the support surface itself (including a microreplicated surface) to aid in creating non-laminar flow within the liquid layer. Such internal non-laminar flow in the liquid layer will facilitate movement of bubbles in the liquid layer from its lower surface toward its upper exposed surface.

As previously mentioned, the electrostatic thinning phenomena itself facilitates bubble motion to the exposed surface of the liquid. As increasing levels of electrostatic fields are employed, surface texturing, patterning and other non-smoothness occur, which can cause micro liquid flow areas and micro vortices which further facilitate bubble motion to the surface.

While the application of electrostatic charges can alone provide deaeration for a liquid layer, its combination with other techniques to enhance thinning of the liquid results in even improved performance. Other fluid thinning methods which can be employed in combination with the application of electrostatics application of the present invention include: inclining the liquid layer support surface (and/or creating an increase in such inclination); increasing the support surface velocity relative to the upstream liquid layer velocity (this can be accomplished by transferring the liquid layer from a slide area to a rotating roll (i.e., from one surface to another where the second surface has a higher surface velocity)) or by applying the liquid layer to a moving support (i.e., from a coating dye or from an unbounded falling stream); heating the liquid layer; applying air pressure to the liquid layer; employing inertia forces (i.e., employing a rotating structure utilizing centrifugal forces or a structure achieving linear acceleration); increasing the support surface area (i.e., defining the support surface as an elastic web which is then stretched); or by doctoring the liquid layer (i.e., using a scraper blade where a thin layer is allowed to remain on the support surface). While all of these techniques will assist in achieving additional thinning of the liquid layer, none requires a flow of charged particles for inducing thinning of the liquid layer. FIGS. 6–9 illustrate some of these additive liquid layer thinning techniques for inducing thinning of the liquid layer either at a charge station or prior thereto.

Figures 6, 7:
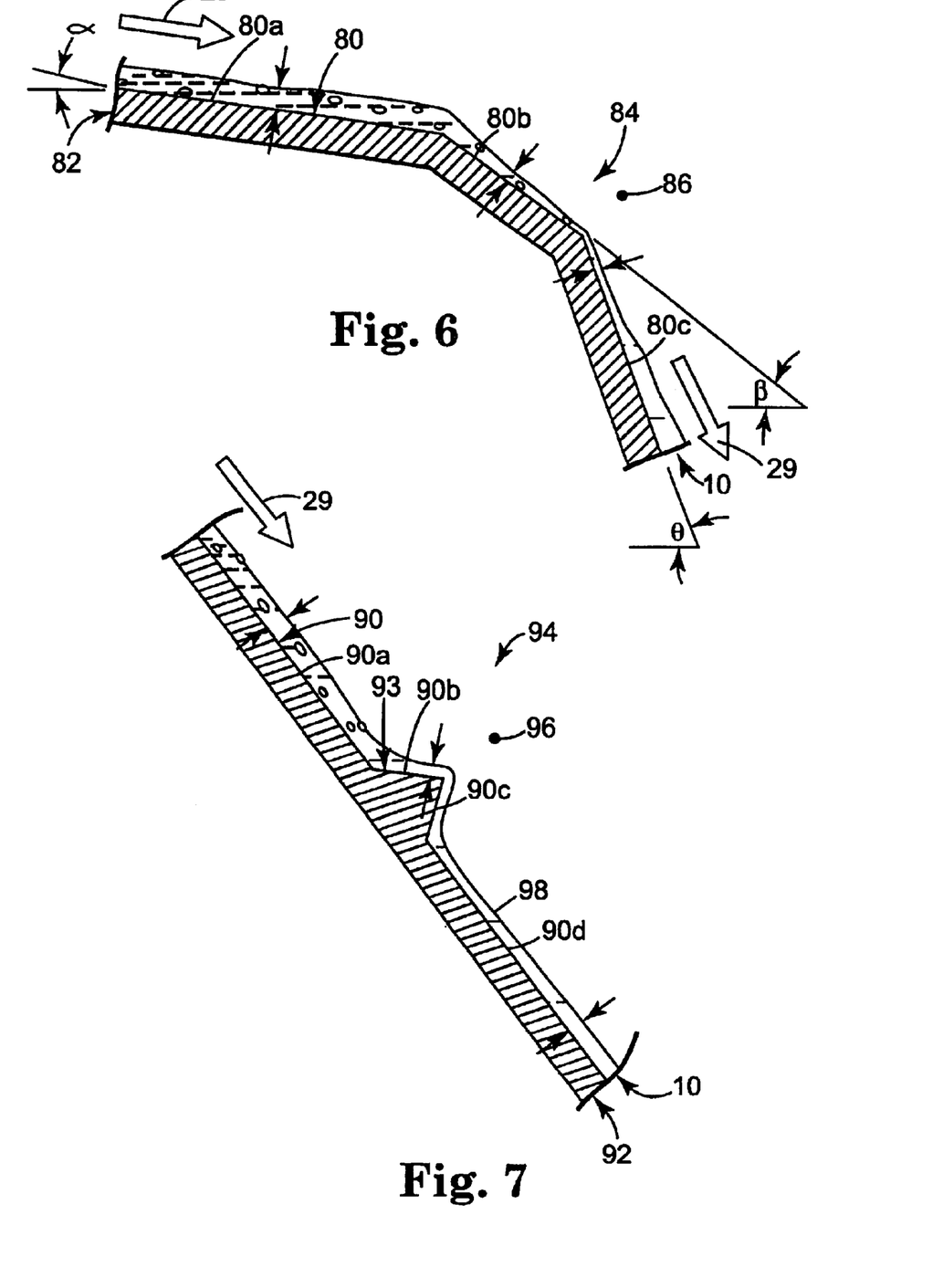
FIGS. 6 and 7 illustrate alternative embodiments of electrostatic application apparatus with an inclined support surfaces, wherein adjacent a charge station, the inclination of the support surface is changed.

FIG. 6 shows the liquid layer 10 on a slide defined by a support surface 80 of a supporting member 82. The support surface 80 is inclined at initial support surface 80a at an angle $\alpha$, relative to horizontal. The liquid layer 10 flows downhill by gravity, in direction of arrows 29. The support surface 80 has a first change in inclination, to a steeper inclined surface 80b which has an angle $\beta$, relative to horizontal. Thinning of the liquid layer 10 is first induced by the incline of support surface 80a, and further induced by the increased inclination of the support surface 80b. The support surface 80 has a second change in inclination, downstream from the first change, to an even steeper inclined surface 80c which has an angle $\theta$, relative to horizontal (i.e., $\theta > \beta > \alpha$). Thinning of the liquid layer 10 is further induced by the increased incline of the support surface 80c. A charge station 84 is defined by an electrode angle 86 adjacent the sharp point (lateral line) where the support surface inclination changes at the second change. The sharp point (lateral line) not only provides an additional mechanical thinning component (including gravity and surface tension effects), but the operative electrical field intensifies around it, thereby further thinning the liquid layer 10. The flow of charged particles provided by the electrode 86 further thins the liquid layer 10 adjacent to charge station 84, thereby moving the bubbles entrained in the liquid layer 10 closer to an exposed upper surface 86 of the liquid layer 10, rupturing those bubbles for deaeration.

FIG. 7 shows an alternative embodiment of a change in inclination of the support surface relative to the liquid layer. In FIG. 7, the liquid layer 10 flows down along support surface 90 of a supporting member 92, which has support surface sections 90a, 90b, 90c and 90d. Support surface sections 90b and 90c are defined on a structure 93 defined on the supporting member 92 adjacent a charge station 94 (which is defined by an electrode 96). As noted above, such a structure may take a particular form to define a wall, weir or dam within the liquid layer 10, or may be a microreplicated surface or include a microreplicated surface thereon. As the liquid layer 10 flows from support surface section 90b to the increased inclination of the support surface section 90c, the liquid layer 10 is thinned. The change in inclination is defined along a sharp edge (lateral line) between surfaces 90b and 90c which, as mentioned above relative to FIG. 6, provides an additional mechanical thinning component and intensifies the operative electrical field around it. As illustrated in FIG. 7, further thinning of the liquid layer 10 by electrostatics causes the bubbles entrained in the liquid layer 10 to move toward an exposed upper surface 98 thereof and to be burst as the moving stream liquid layer 10 passes the charge station 94 and structure 93.

Figure 8:
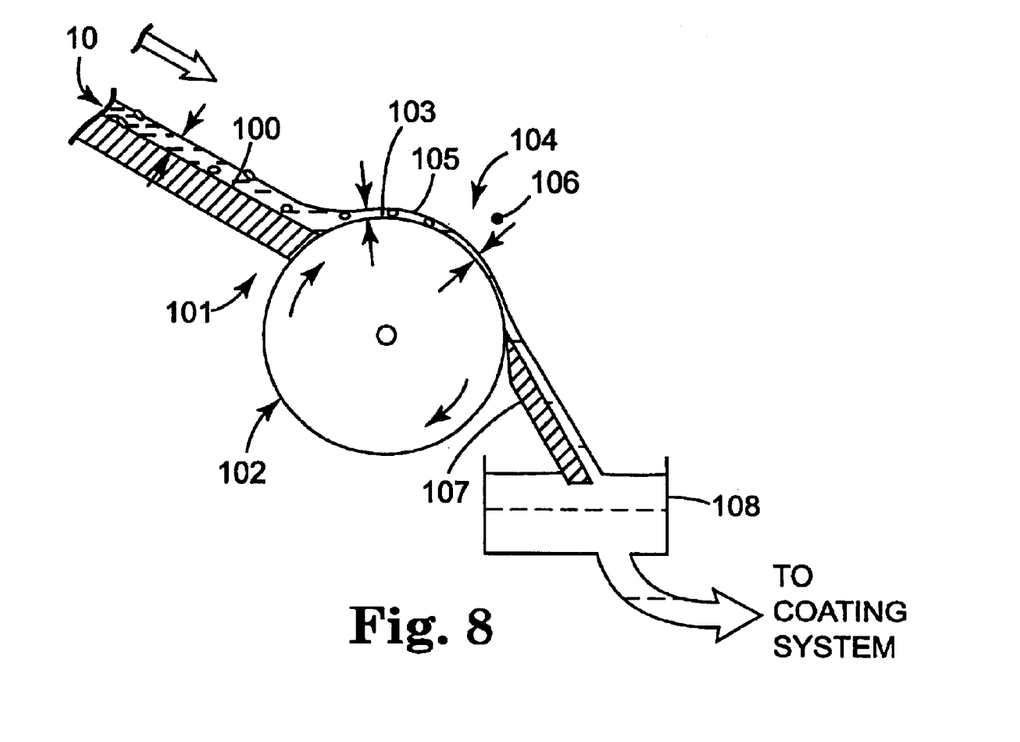
FIG. 8 illustrates an alternative embodiment of an electrostatic application apparatus with a support surface, wherein a portion of the support surface has an increased surface velocity adjacent the charge station.

FIG. 8 illustrates an embodiment of the present invention where the support surface for the liquid layer has a higher surface velocity downstream than upstream, so that the liquid layer is extensionally stretched to thin the liquid layer, either at or prior to an electrostatic charge station. In FIG. 8, an inclined support surface 100 supports the liquid layer 10. A supporting member 101 for the liquid layer 10 includes not only the support surface 100, but also a rotating roll 102 which has a circumferential surface 103 moving at a higher longitudinal velocity than the support surface 100 (which is a stationary surface). This increase in velocity of the liquid layer's support surface (as the moving stream liquid layer 10 is transferred from the support surface 100 to the surface 103 of the roll 102) tends to longitudinally draw out the liquid layer 10, extensionally stressing the liquid to a lesser thickness. The liquid layer 10 is then passed by a charge station 104 defined by an electrode 106 which provides a flow of charged particles above the liquid layer 10 and directed towards the surface 103 of the roll 102. There is a potential difference between the charged particles and the charge applied to the surface 103 of the roll 102 (or the roll is grounded) so that the charged particles are attracted towards the surface 103. The extensional thinning of the liquid layer 10 and further thinning caused by the electrostatics causes the bubbles entrained in the liquid layer 10 to move toward its exposed upper surface 105 and to rupture. The deaerated liquid is then wiped or doctored from the surface 103 of the roll 102 by a doctor blade 107 and collected in a deaerated liquid reservoir 108. From the reservoir 108, the deaerated liquid can then be advanced for further processing (e.g., to a liquid coating station in the case of a coating solution).

Figure 9:
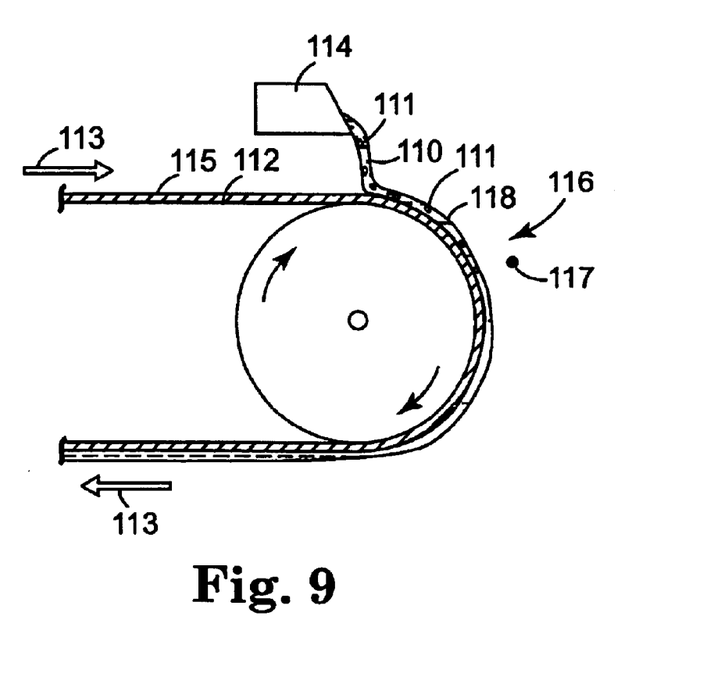
FIG. 9 illustrates an alternative embodiment of an electrostatic application apparatus with a moving support surface.

FIG. 9 illustrates another embodiment of the use of electrostatics for deaeration. In this case, a coating solution 110 (having bubbles 111 entrained therein) is deposited on a moving substrate which is defined as an endless web 112 (which is moving in direction of arrows 113). The coating solution 110 is fed from a coating die 114 and, as it engages a support surface 115 of the endless web 112, it is drawn out and thinned by the longitudinal movement thereof. The thinned coating solution 110 on the web 112 then passes a charge station 116, defined by an electrode 117. Bubbles entrained in the coating solution 110 are moved toward an exposed upper surface 118 thereof as the coating solution 110 is thinned (both by the movement of the support surface 115 and the electrostatics at the charge station 116) and are then burst to deaerate the coating solution 110.

Figure 10:
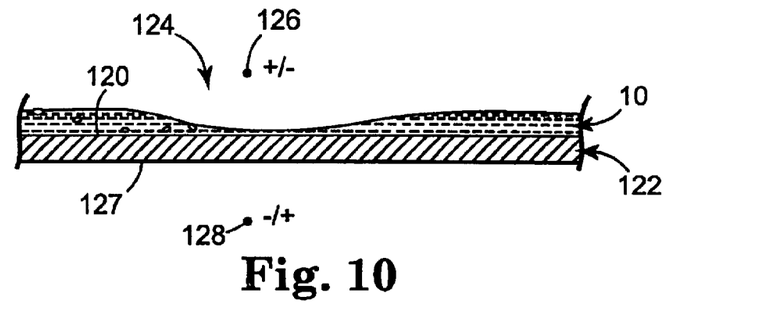
FIGS. 10–12 illustrate alternative embodiments of apparatus for the application of electrostatics of the present invention wherein the liquid layer is exposed to a phased application of electrostatic particles.
Figure 11:
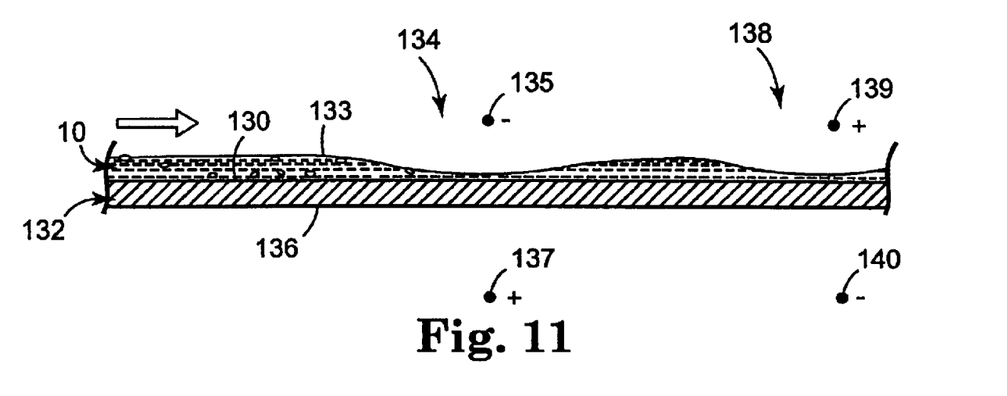
Figure 12:
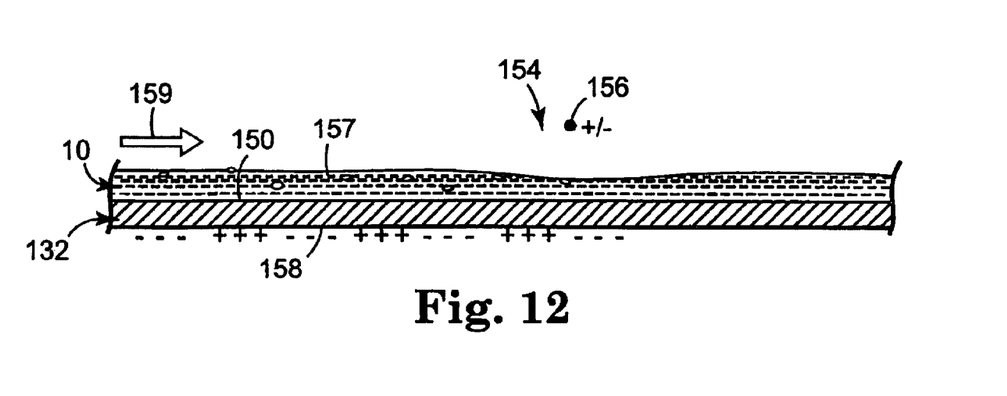

While a few specific embodiments of implementations of the present invention are shown and discussed herein, one of ordinary skill will appreciate that numerous alternative arrangements are possible, combining the disclosed features and advantages to achieve the desired results (deaeration). In the above examples of applications for the present invention, the support surface is conductive (so that, for instance, when the charged particles have a first polarity, the support surface may have a second, opposite polarity). In those instances where the support surface is non-conductive, the inventive application of electrostatics can still be used to deaerate a liquid layer. Exemplary arrangements for doing so are illustrated in FIGS. 10, 11 and 12. Although these figures illustrate the liquid layer in a horizontal orientation, inclined arrangements are also contemplated.

In FIG. 10, the liquid layer may be either moving or stationary relative to its support surface and charge station. The liquid layer 10 is supported on a support surface 120 of a supporting member 122 (which again, is non-conductive). A charge station 124 is defined above the liquid layer 10, by electrode 126. On a second side 127 of the supporting member 122, a second source of charges, such as electrode 128, is provided. The second electrode 128 provides charges of an opposite polarity from those generated by the first electrode 126, which are then placed on the second side 127 of the supporting member 122. Accordingly, even though the supporting member 122 is non-conductive, a charge potential is provided which serves to create the necessary electrostatic force on the liquid layer 10, thereby thinning the liquid layer 10 and, as a result, moving bubbles entrained therein towards its exposed surface and rupturing those bubbles. In one embodiment, the electrical charges on the second side 127 of the supporting member 122 reside thereon. The electrodes 126 and 128 can be periodically reversed in polarity, for increased effectiveness, so long as they are phased to be reversed simultaneously (i.e., to define an alternating current pattern therebetween). The charges on the second side 127 may come from an electrode 128, or may be provided by a remote ion generator or even by some other means for defining an external electrical field (with no charges applied to the second side 127 of the support member 122). Typically, charges from a corona source on the second side are the most effective, with an external electrical field, or grounded structure on the second side also being functional but generally less effective. Also, with corona source or field close to the second side, repeatedly reversing the polarity of the flow of charged particles from the top side charge station can still be somewhat effective if the applied voltages are sufficiently high.

FIG. 11 illustrates an embodiment of the present invention where multiple electrodes are provided above a moving stream liquid layer 10. The liquid layer 10 is supported on a support surface 130 (which is non-conductive) of a supporting member 132 (which may be non-conductive). At a first charge station 134, a negative electrode 135 is provided above an exposed upper surface 133 of the liquid layer 10. On a second side 136 of the supporting member 132, a positive electrode, rod or ion generator 137 is provided, opposite the negative electrode 135. Accordingly, a potential difference is provided between the charges provided by the two electrodes 135 and 137, so that a flow of particles between the electrodes 135 and 137 causes localized thinning of the liquid layer 10 adjacent to charge station 134, in the manner described above. Longitudinally downstream from the first charge station 134, a second charge station 138 (with reversed polarity from the first charge station 134) is provided above the exposed upper surface 133 of the liquid layer 10. The second charge station is defined by a positive electrode 139 and a negative electrode rod or ion generator 140, with the electrodes 139 and 140 aligned to be opposite one another across the supporting member 132. At the second charge station 138, the potential difference between the electrodes 139 and 140 again causes a flow of charged particles which results in localized thinning of the liquid layer 10, albeit with an opposite charge flow relationship. As the moving stream liquid layer 10 flows, therefore, it is first subjected to electrostatics (and consequent bubble movement and rupture) adjacent the first charge station 134, and then sequentially again adjacent the second charge station 138. The flow of charges directed against the upper surface 133 of the liquid layer is opposite in polarity from the first charge station 134 to the second charge station 138. This arrangement again provides an effective means for deaerating the liquid layer prior to its further processing such as its use as a coating solution. As noted above, a flow of charged particles is provided at the charge station above the liquid layer, while an oppositely phased electrical field or flow of charged particles can be provided on the other side of the supporting member. For lower conductivity and/or higher viscosity fluids, the number of charge stations can be increased.

FIG. 12 illustrates yet another embodiment of the present invention for use with a non-conductive supporting member. A liquid layer 10 is supported by a support surface 150 of a supporting member 152. A charge station 154 is defined by an electrode 156 which is disposed above an upper exposed surface 157 of the liquid layer 10. The charge phase of the electrode 156 can be alternated between positive and negative by suitable control means (not shown). Upstream from the charge station 154, electrical charges are exposed to a second side 158 of the supporting member 152 and deposited thereon as pre-charges. The pre-charges are deposited onto the supporting member 152 in an alternating manner, phased positive then negative, positive then negative, etc. (see FIG. 12). The supporting member 152 and liquid layer 10 thereon are moved in direction of arrow 159 past the charge station 154. The rate of movement of the supporting member 152 and liquid layer 10 are coordinated with the electrical charge phasing of the electrode 156, so that a negatively charged portion of the supporting member 152 is in the charge station 154 when the electrode 156 is positively charged, and vice versa when the electrode 156 goes negative. In this manner, the charged particles from the electrode 156 alternate positive, negative, positive, negative, etc., corresponding to an alternating opposite phase change of the supporting member 152 passing thereby. No matter which phase is being presented, however, the charged particles at the charge station 154 are directed in a flow from the electrode 156 towards the support surface 150, thereby causing stresses on the liquid layer 10 to thin the liquid layer 10 and as a result, bring the bubbles entrained therein toward its exposed upper surface 157 to be ruptured.

In those embodiments where an alternating charge phase scheme is employed, the alternating current source cycles at generally from 1 to 10 cycles per second, but can be higher or lower (and, of course, is dependent on liquid layer velocity relative to the charge station). In all embodiments, the source of charged particles is at least one of a direct current source, an alternating current source, or a pulsed direct current source.

Figure 13:
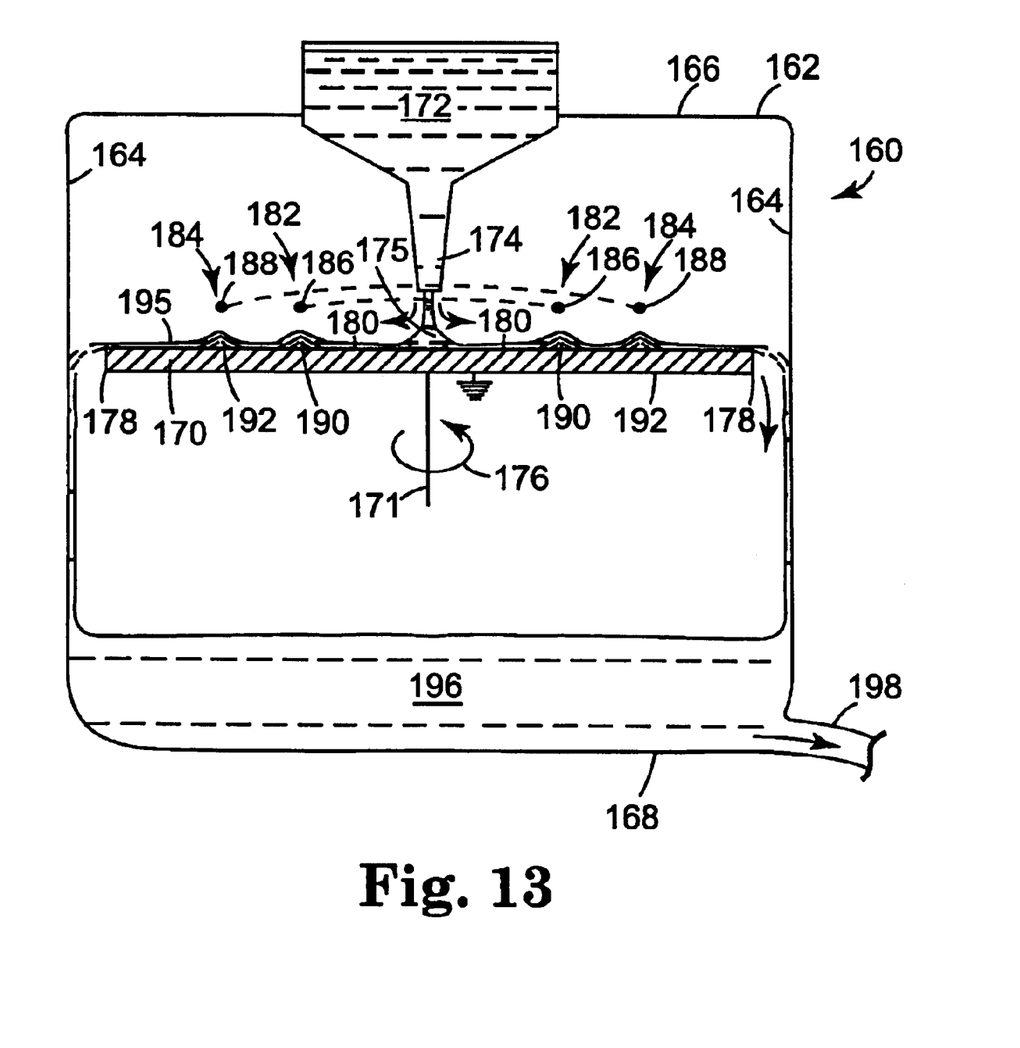
FIG. 13 illustrates an electrostatic application apparatus in combination with a slinger-degasser.

One conventional means for degassing a liquid such as a coating fluid is by the use of an apparatus known as a slinger-degasser. FIG. 13 illustrates the use of a slinger-degasser 160 in combination with the electrostatic deaeration process of the present invention. The slinger-degasser 160 has a chamber 162 defined in part by cylindrical inner wall 164, upper wall 166 and lower wall 168. A slinger disk 170 is rotatably disposed within the chamber 162 (on a slinger disk axis 171), coaxially with the cylindrical inner wall 164. In the illustrated embodiment, the slinger disk 170 is conductive and grounded. A liquid reservoir 172 provides a stream of liquid 175 onto the slinger disk 170 from a nozzle 174 aligned coaxially with the axis of the slinger disk 170. Liquid 175 is dispensed from the nozzle 174 near the center of the slinger disk 170, as shown. The slinger disk 170 is rotated on its axis 171 (e.g., in direction of arrow 176) so that as the liquid 175 contacts a central portion of the slinger disk 170, it spreads out into a thin film and flows outwardly toward an outer edge 178 of the slinger disk 170. The thin film initially defines a liquid layer 180 of the liquid 175.

One or more electrostatic charge stations 182 and 184 are disposed radially between the center of the slinger disk 170 and its outer edge 178. In the embodiment illustrated in FIG. 13, charge station 182 is defined by an annular electrode 186, while charge station 184 is defined by an annular electrode 188. The electrodes 186 and 188 are concentrically aligned about the axis of the disk 170, with the second electrode 188 outside the first electrode. In addition, optional annular structures 190 and 192 are disposed on a support surface 195 of the slinger disk 170 to further induce thinning of the liquid layer 180 as it traverses the support surface 195.

The structures 190 and 192 are radially disposed below the electrodes 182 and 184, respectively. Accordingly, as the liquid layer 180 traverses the charge stations 182 and 184, the flow of electrical charge from each respective electrode 186 and 188 thins the liquid layer (along with the effect of the structures 190 and 192, respectively) thereby moving bubbles entrained in the liquid layer 180 closer to an exposed upper surface thereof and rupturing those bubbles.

In the embodiment illustrated in FIG. 13, two annular electrodes are provided. One electrode may be sufficient, or more than two provided, as desired for deaeration performance. In addition, the electrodes need not be annular or continuous. The slinger disk rotates, so as long as an electrode is disposed somewhere over the slinger disk, the liquid layer on the slinger disk will be exposed to the flow of charged particles emanating from the electrode above the slinger disk. Again, while an electrode is specifically mentioned, any suitable means for defining the requisite flow of charged particles over and at the liquid layer will suffice, such as a remote ion generator.

When the deaerated liquid layer reaches the edge 178 of the spinning slinger disk 170, it is flung from the slinger disk 170 and strikes the inner wall 164 of the chamber 162. The liquid 175 flows down the inner wall 164 as a thin film, and collects in deaerated reservoir 196 therebelow. The deaerated liquid is then directed via a suitable outlet 198 for further processing. The pressure in the chamber 164 can be controlled to facilitate the breakage of bubbles and dissolved gasses in the liquid 175.

Electrostatic deaeration approach of the present invention is particularly useful for facilitating the operation of a slinger-degasser such as illustrated in FIG. 13. In operation, a slinger-degasser requires extensive pressure seals in order to maintain low pressure or vacuum conditions when degassing a liquid. Through use of the electrostatics techniques described above and illustrated in FIG. 13 in connection with a slinger-degasser, degassing of the liquid by operation of a slinger-degasser is improved without such exacting pressure conditions being required. The liquid can be degassed in a slinger-degasser at the same level or an improved level by means of the additive deaeration effects of the electrostatic techniques of the present invention, thereby leading to a lower cost slinger-degasser which will also have a longer operational system life.

An experiment with a multiple charge station system with triangular structures on the support surface, such as shown in FIG. 7, was conducted with a 100% solids curable acrylate syrup with a conductivity of 9 nanoSiemens per meter. The electrostatic deaeration station consisted of a support surface defined by an 18 inch wide plate inclined at about 75 degrees (relative to horizontal), with three raised triangular sections laterally extending across the plate. Three corona wires were spaced about three inches apart and about 0.50 inch above each raised section. The syrup with many entrained air bubbles was introduced to the top of the plate with a slot coater. The viscosity of the syrup was about 3,000 centipoise. The corona wire voltage was held at 20,000 volts. This small system was easily capable of deaerating the volume of syrup necessary to coat a 48 inch wide web with 2 mil thick coating of the syrup at 130 feet per minute. The same flow rate with a commercially available slinger-degasser required a much larger, more complicated piece of equipment, including vacuum pumps and the rotary slinger-degasser unit. The electrostatic system not only was a much more compact piece of equipment, but does any moving parts or vacuum or seals to maintain.

The present invention thus provides a very effective means for deaerating a liquid layer of low conductivity liquid. As long as the electrical resistivity of the liquid is sufficiently high such that charges applied to an exposed surface of the liquid create a stress on the liquid for a sufficient duration of time to create local deformation and thinning of the liquid thickness, bubbles entrained in the liquid will move closer to the exposed surface and be ruptured. Other additive techniques for additional thinning of the liquid layer and/or movement of the bubbles therein towards the exposed surface are also contemplated, as noted herein. The various features and structures disclosed herein can be combined in numerous alternative combinations (beyond those exemplary arrangements illustrated and discussed) to achieve the advantages provided by electrostatic deaeration.

Although the present invention has been described with reference to preferred embodiments, workers skilled in the art will recognize that changes may be made in form and detail without departing from the spirit and scope of the invention.

What is claimed is:

1. A method of deaerating a gas contained in a low conductivity liquid, comprising:
   providing a support surface;
     establishing a layer of liquid having a first lower surface contacting the support surface and a second exposed surface, the layer of liquid having bubbles of gas entrained therein and having a thickness; and
     causing localized thinning of the layer of liquid by providing a flow of charged particles above the layer of liquid and towards the support surface whereby the bubbles of gas entrained in the layer of liquid are moved closer to the second exposed surface and ruptured.

2. The method of claim 1 wherein the causing step includes an additional step of inducing localized thinning of the layer of liquid which does not require providing a flow of charged particles.

3. The method of claim 1 wherein the flow of charged particles is provided above the layer of liquid at a charge station, and wherein there is relative longitudinal movement between the layer of liquid and the charge station.

4. The method of claim 3, and further comprising:
   moving the layer of liquid relative to a stationary charge station.

5. The method of claim 4 wherein the moving step includes moving the support surface.

6. The method of claim 4, and further comprising:
   statically mixing the layer of liquid upstream from the charge station, relative to liquid movement.

7. The method of claim 6 wherein the statically mixing step comprises:
   providing a microreplicated surface on the support surface.

8. The method of claim 4 and further comprising:
   providing a structure disposed within the layer of liquid, adjacent the charge station, to enhance local thinning of the layer of liquid.

9. The method of claim 8 wherein the structure is disposed on the support surface.

10. The method of claim 3 wherein the additional inducing step comprises:
    disposing a structure within the layer of liquid adjacent the charge station.

11. The method of claim 10 wherein the structure is disposed on the support surface.

12. The method of claim 11 wherein the structure comprises a microreplicated surface.

13. The method of claim 3 wherein the causing step includes an additional step of inducing thinning of the layer of liquid which does not require providing a flow of charged particles at an area that is at least one of: the charge station or prior to movement of the layer of liquid into the charge station.

14. The method of claim 13 wherein the additional inducing step comprises providing relative longitudinal movement between the layer of liquid and the support surface.

15. The method of claim 13 wherein the additional inducing step comprises transferring the layer of liquid from the support surface to a substrate surface having a higher longitudinal velocity than the support surface in order to extensionally stress and thin the layer of liquid.

16. The method of claim 3 wherein the support surface is on a support which has a first side, defined by the support surface, and a second side, wherein the support surface of the support is non-conductive, and further comprising:

providing electrical charges on the second side of the support which have an opposite polarity to the flow of charged particles above the layer of liquid.

17. The method of claim 16 wherein the electrical charges are provided on the second side of the support upstream from charge station.

18. The method of claim 3 wherein the source of the charged particles is at least one of: a direct current source, an alternating current source, or a pulsed direct current source.

19. The method of claim 18 wherein the alternating current source cycles at from 1 to 10 cycles per second.

20. The method of claim 16 wherein the source of the charged particles is an alternating current source and the electrical charges on the second side of the support are phased to be an opposite polarity to the charged particles.

21. The method of claim 4 and further comprising:

creating turbulence in the layer of liquid adjacent the charge station.

22. The method of claim 21 wherein the turbulence creating step includes at least one of: a static mixer or an electrostatic field.

23. The method of claim 1 wherein the causing step includes providing the flow of charged particles at a level sufficient to create vortices in the layer of liquid which urge the bubbles of gas entrained in the layer of liquid toward the second exposed surface.

24. The method of claim 1 wherein the support surface is on a support which has a first side, defined by the support surface, and a second side, wherein the support surface of the support is non-conductive, and further comprising:

providing electrical charges on the second side of the support which have an opposite polarity to the flow of charged particles above the layer of liquid.

25. The method of claim 24 wherein the electrical charges on the second side of the support reside on the second side of the support.

26. The method of claim 1 wherein the liquid-bearing surface of the support is grounded.

27. The method of claim 1 wherein the support surface is conductive.

28. The method of claim 1, and further comprising:

acoustically exciting the support surface.

29. The method of claim 28 wherein the acoustically exciting step comprises exciting the support surface at ultrasonic frequencies.

30. The method of claim 1 wherein the causing step comprises:

electrically energizing an electrode above the second exposed surface of the layer of liquid to generate the charged particles.

31. The method of claim 30 wherein the electrode is a corona wire.

32. The method of claim 1 wherein the causing step comprises:

electrically energizing a plurality of electrodes above the exposed surface of the layer of liquid to generate the charged particles.

33. The method of claim 32 wherein there is relative longitudinal movement between the layer of liquid and the electrodes, and at least two charge stations are defined longitudinally along the layer of liquid by charged particles from the electrodes, and further comprising:

statically mixing the layer of liquid between the two charge stations, relative to liquid movement.

34. The method of claim 1 wherein the causing step comprises:

generating the charged particles by an ion generator remotely positioned relative to the layer of liquid; and transferring the charged particles from the ion generator to the second exposed surface of the layer of liquid through a fluid medium.

35. The method of claim 1 wherein there is an absence of relative motion between the layer of liquid and the support surface.

36. The method of claim 1 wherein the support surface is at an elevated potential relative to ground.

37. The method of claim 1 wherein the charged particles have a first polarity, and wherein the support surface has a second, opposite polarity.

38. The method of claim 1 and further comprising:

degassing the layer of liquid, prior to the causing step.

39. An apparatus for deaerating a gas contained in a low conductivity liquid, comprising:

a support surface for supporting a layer of liquid which has a first lower surface contacting the support surface and a second, exposed surface, with the layer of liquid having bubbles of gas entrained therein and having a thickness; and means for causing localized thinning of the layer of liquid by providing a flow of charged particles above the layer of liquid and towards the support surface whereby the bubbles of gas entrained in the layer of liquid are moved closer to the second exposed surface and ruptured.

* * * * *

UNITED STATES PATENT AND TRADEMARK OFFICE
CERTIFICATE OF CORRECTION

PATENT NO. : 6,726,743 B2
DATED : April 27, 2004
INVENTOR(S) : Louks, John W.

It is certified that error appears in the above-identified patent and that said Letters Patent is hereby corrected as shown below:

Column 6,
Line 56, delete "it" before "were."

Signed and Sealed this

Thirtieth Day of November, 2004

JON W. DUDAS
*Director of the United States Patent and Trademark Office*